United States Patent
Cho

(10) Patent No.: US 9,673,705 B2
(45) Date of Patent: Jun. 6, 2017

(54) POWER SUPPLY APPARATUS AND DISPLAY DEVICE INCLUDING THE SAME

(71) Applicant: LG Display Co., Ltd., Seoul (KR)

(72) Inventor: Min-Su Cho, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 113 days.

(21) Appl. No.: 14/584,554

(22) Filed: Dec. 29, 2014

(65) Prior Publication Data
US 2015/0188431 A1  Jul. 2, 2015

(30) Foreign Application Priority Data
Dec. 30, 2013 (KR) .................. 10-2013-0167916

(51) Int. Cl.
*H02M 3/158* (2006.01)
*G09G 3/20* (2006.01)
(Continued)

(52) U.S. Cl.
CPC .......... *H02M 3/158* (2013.01); *G09G 3/2003* (2013.01); *G09G 3/3208* (2013.01); *G09G 3/3225* (2013.01); *G09G 3/3406* (2013.01); *G09G 3/3648* (2013.01); *G09G 2320/0276* (2013.01); *G09G 2320/0646* (2013.01); *G09G 2320/0673* (2013.01); *G09G 2330/02* (2013.01);
(Continued)

(58) Field of Classification Search
CPC ... G09G 2320/0276; G09G 2320/0646; G09G 2320/0673; G09G 2330/02; G09G 2330/04; G09G 2360/08; G09G 2360/16; G09G 3/2003; G09G 3/3208; G09G 3/3225; G09G 3/3406; G09G 3/3648
See application file for complete search history.

(56) References Cited

U.S. PATENT DOCUMENTS

| 7,109,965 B1 | 9/2006 | Lee et al. |
| 2008/0157699 A1* | 7/2008 | Lee .................... H05B 33/0818 315/294 |

(Continued)

FOREIGN PATENT DOCUMENTS

| DE | 1 993 58 34 A1 | 3/2000 |
| EP | 2 009 791 A1 | 12/2008 |

OTHER PUBLICATIONS

Wikipedia, "Inductor (Electrical Engineering), Induktor (Elektrotechnik)," Version: Nov. 16, 2012, https://de.wikipedia.org/w/index.php?title=induktor_%28Elektrotechnik%29&oldid=110582727, with machine translation.

Primary Examiner — Kenneth Bukowski
(74) Attorney, Agent, or Firm — Birch, Stewart, Kolasch & Birch, LLP

(57) ABSTRACT

Disclosed are a power supply apparatus and a display device including the same, which prevent damage caused by an overcurrent. The power supply apparatus includes a voltage converter configured to convert an input power into a DC voltage by using an inductor, a voltage stabilizer configured to stabilize the DC voltage which is supplied from the voltage converter through an intermediate node, and output the stabilized DC voltage to an output terminal, and an overcurrent cutoff unit connected between the voltage converter and the intermediate node, and configured to cut off an overcurrent which flows from the voltage converter to the intermediate node, based on a voltage of the intermediate node.

19 Claims, 6 Drawing Sheets

(51) Int. Cl.
  *G09G 3/3208* (2016.01)
  *G09G 3/34* (2006.01)
  *G09G 3/3225* (2016.01)
  *H02M 1/36* (2007.01)
  *G09G 3/36* (2006.01)
  *H02M 1/32* (2007.01)

(52) U.S. Cl.
  CPC ..... *G09G 2330/04* (2013.01); *G09G 2360/08* (2013.01); *G09G 2360/16* (2013.01); *H02M 1/32* (2013.01); *H02M 1/36* (2013.01)

(56) References Cited

U.S. PATENT DOCUMENTS

| | | | |
|---|---|---|---|
| 2010/0046124 A1 | 2/2010 | Hibi | |
| 2010/0123978 A1 | 5/2010 | Lin et al. | |
| 2010/0302698 A1* | 12/2010 | Ueda | H02H 9/001 361/93.1 |
| 2011/0187337 A1 | 8/2011 | Lin et al. | |
| 2011/0187693 A1* | 8/2011 | Chung | G09G 5/00 345/211 |
| 2012/0049829 A1* | 3/2012 | Murakami | H02M 1/32 323/288 |
| 2014/0145698 A1* | 5/2014 | Saito | G05F 1/468 323/285 |

* cited by examiner

POWER SUPPLY APPARATUS AND DISPLAY DEVICE INCLUDING THE SAME

CROSS-REFERENCE TO RELATED APPLICATIONS

This application claims priority to and the benefit of the Korean Patent Application No. 10-2013-0167916 filed on Dec. 30, 2013, which is hereby incorporated by reference as if fully set forth herein.

BACKGROUND OF THE INVENTION

Field of the Invention

Embodiments of the invention relate to a power supply apparatus and a display device including the same.

Discussion of the Related Art

Generally, power supply apparatuses rectify an alternating current (AC) voltage to convert into a direct current (DC) voltage, or boost or drop a DC voltage to a desired voltage, thereby supplying a desired DC voltage to various devices (for example, display devices, light emitting diodes (LEDs), etc.)

FIG. 1 is a diagram for describing a related art power supply apparatus.

Referring to FIG. 1, the related art power supply apparatus includes a voltage converter 10, which converts an input power Vin into a DC voltage having a higher voltage level than the input power Vin by using an inductor L, and a voltage stabilizer 20 that stabilizes an output voltage Vout output from the voltage converter 10.

The voltage converter 10 includes a first switching element SW1 that is connected between the inductor L and the voltage stabilizer 20, a second switching element SW2 that is connected between a ground node and a node which is disposed between the inductor L1 and the first switching element SW1, and a pulse width modulation (PWM) controller 12 that generates first and second PWM signals S1 and S2 with a feedback output voltage to control a switching operation of each of the first and second switching elements SW1 and SW2. The voltage converter 10 stores a current in the inductor L with the input power Vin according to the switching operations of the first and second switching elements SW1 and SW2 based on the first and second PWM signals S1 and S2 of the PWM controller 12, and adds the current, stored in the inductor L, to the input power Vin to output a DC voltage having a higher voltage level than the input power Vin.

The voltage stabilizer 20 includes a third switching element SW3, which is connected between an output terminal Pout and an intermediate terminal (or an intermediate node) Pmin which is supplied with the DC voltage from the voltage converter 10, and a low drop out (LDO) controller 22 that generates a third PWM signal S3 with the feedback output voltage to control a switching operation of the third switching element SW3. The voltage stabilizer 20 stabilizes an output voltage Vout output from the voltage converter 10 according to the switching operation of the third switching element SW3 based on the third PWM signal S3, and outputs the output voltage Vout to the output terminal Pout.

The voltage converter 10 and the voltage stabilizer 20 may be integrated into one integrated circuit (IC), and mounted on a printed circuit board (PCB). The PCB includes an input terminal Pin to which the input power Vin is applied, an intermediate terminal Pmin which is supplied with the DC voltage from the voltage converter 10, and the output terminal Pout. Here, each of capacitors C for removing ripple and/or noise is connected between the input terminal Pin, the intermediate terminal Pmin, the output terminal Pout and respective grounds.

In the related art power supply apparatus, when short circuit between the intermediate terminal Pmin and a ground occurs due to a foreign material such as dust, a potential of the intermediate terminal Pmin is 0 V. At this time, without the first switching element SW1 of the voltage converter 10 acting as an ideal switch, a closed circuit in which a current flows through an internal diode of the first switching element SW1 which is in a forward direction with respect to a direction of a current is formed, and thus, as illustrated in FIGS. 2 and 3, the potential Vmin of the intermediate terminal Pmin always is 0 V, whereby an overcurrent Iinput flows instantaneously. For this reason, the inductor L and the first switching element SW1 of the voltage converter 10 are damaged (or broken down).

For example, in an instance where the input power is 3.7 V, a DC resistance (DCR) of the inductor L is 0.3Ω, and a forward voltage (VF) of the first switching element SW1 is 0.7 V, a current of 10 A flows to the ground through the inductor L and the internal diode of the first switching element SW1 when the intermediate terminal Pmin is short-circuited, and thus, a current equal to or higher than a rated current flows in the inductor L and the first switching element SW1. For this reason, the IC is damaged, and due to a momentary overcurrent, the IC and the PCB are heated, causing firing.

SUMMARY OF THE INVENTION

Accordingly, the embodiments of the invention are directed to provide a power supply apparatus and a display device including the same that substantially obviate one or more problems due to limitations and disadvantages of the related art.

The embodiments of the invention are directed to provide a power supply apparatus and a display device including the same, which prevent damage caused by an overcurrent.

In addition to the aforesaid objects of the embodiments of the invention, other features and advantages of the embodiments of the invention will be described below, and will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a power supply apparatus including: a voltage converter configured to convert an input power into a DC voltage by using an inductor; a voltage stabilizer configured to stabilize the DC voltage which is supplied from the voltage converter through an intermediate node, and output the stabilized DC voltage to an output terminal; and an overcurrent cutoff unit connected between the voltage converter and the intermediate node, and configured to cut off an overcurrent which flows from the voltage converter to the intermediate node, based on a voltage of the intermediate node.

The overcurrent cutoff unit may include: a switching transistor connected between the voltage converter and the intermediate node; and a shutdown controller configured to generate a shutdown signal, based on a voltage of the intermediate node, to control a switching operation of the switching transistor.

The switching transistor may include an internal diode formed in a reverse direction with respect to a path of a current which flows from the voltage converter to the intermediate node.

When the voltage of the intermediate node is lower than the input power, the shutdown controller may generate a shutdown signal for turning off the switching transistor.

The voltage converter may operate a soft start mode based on a soft start voltage which linearly increases in initial driving, and may linearly increase a voltage level of the DC voltage, and the shutdown controller may generate a shutdown enable signal according to a comparison result of a reference voltage and the soft start voltage, start working according to the shutdown enable signal, and generate a shutdown signal according to a comparison result of the input power and the voltage of the intermediate node.

The power supply apparatus may further include a reference voltage supply unit configured to generate a plurality of reference voltages having different voltage levels by using the input power, select one of the plurality of reference voltages according to a voltage selection signal, and supply the selected reference voltage to the shutdown controller.

In another aspect of the embodiments of the invention, there is provided a display device including: a display panel configured to include a pixel formed in a pixel area defined by an intersection of a gate line and a data line; a panel driver configured to supply a gate signal to the gate line, and supply a data voltage to the data line; and a power supply unit configured to convert an input power into a DC voltage, and supply the DC voltage to at least one selected from the display panel and the panel driver, wherein the power supply unit includes at least one the power supply apparatus.

The display panel may further include a driving power line through which the DC voltage is supplied from the power supply unit to the pixel, and the pixel may include: an organic light emitting diode; and a pixel circuit configured to control a current which flows from the driving power line to the organic light emitting diode, based on the data voltage.

The display device may further including: a backlight unit configured to irradiate light onto the display panel; and a backlight driver configured to drive the backlight unit, wherein the power supply unit may generate the DC voltage for driving of at least one selected from the backlight unit and the backlight driver.

The panel driver may include: a reference gamma voltage generator configured to generate a plurality of reference gamma voltages; a data driving circuit unit configured to convert input pixel data into the data voltage by using the plurality of reference gamma voltages to supply the data voltage to the data line; a gate driving circuit unit configured to supply the gate signal to the gate line; and a timing controller configured to control driving of the data driving circuit unit and the gate driving circuit unit, and supply the pixel data to the data driving circuit unit, and the power supply unit may generate the DC voltage for driving of at least one selected from the reference gamma voltage generator, the data driving circuit unit, the gate driving circuit unit, and the timing controller.

In another aspect of the embodiments of the invention, there is provided a power supply apparatus including: a voltage converter configured to convert an input power into a DC voltage by using an inductor; a voltage stabilizer configured to stabilize the DC voltage which is supplied from the voltage converter through an intermediate node, and output the stabilized DC voltage to an output terminal; and an overcurrent cutoff unit connected between the voltage converter and the intermediate node, and including a switching transistor connected between the voltage converter and the intermediate node to cut off an overcurrent which flows from the voltage converter to the intermediate node when a voltage of the intermediate node is lower than the input power.

It is to be understood that both the foregoing general description and the following detailed description of the embodiments of the invention are by example and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE EMBODIMENTS

Reference will now be made in detail to the example embodiments of the invention, examples of which are illustrated in the accompanying drawings. Wherever possible, the same reference numbers will be used throughout the drawings to refer to the same or like parts.

The terms described in the specification should be understood as follows.

As used herein, the singular forms "a", "an" and "the" are intended to include the plural forms as well, unless the context clearly indicates otherwise. The terms "first" and "second" are for differentiating one element from the other element, and these elements should not be limited by these terms.

It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Hereinafter, a power supply apparatus and a display device including the same according to embodiments of the invention will be described in detail with reference to the accompanying drawings.

Figure 4:
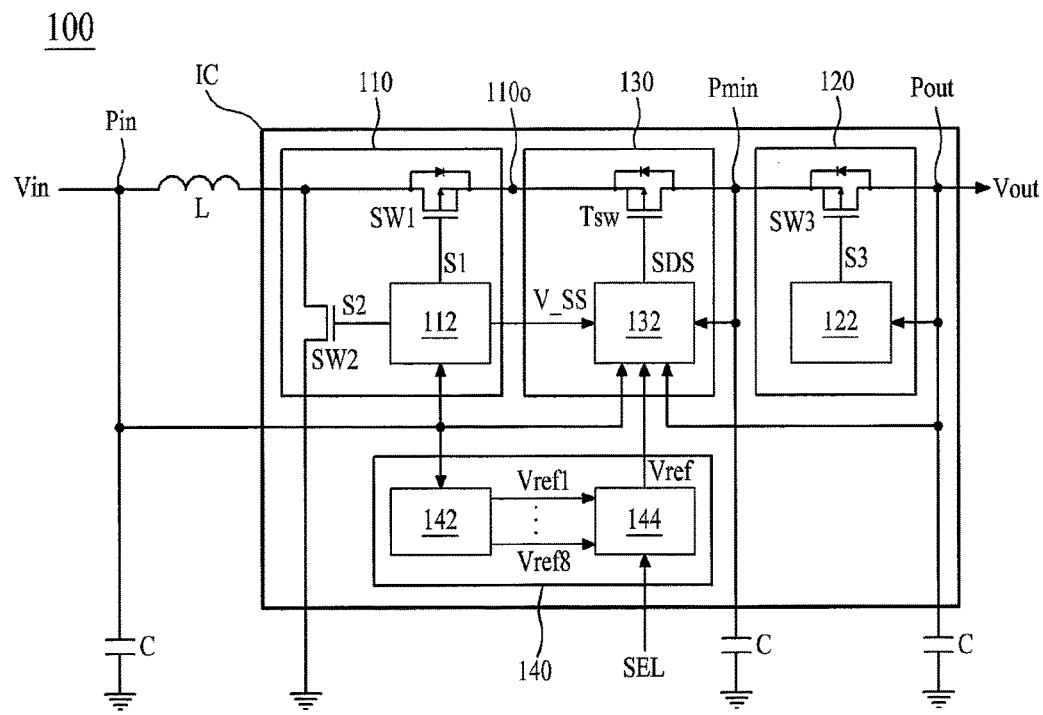
FIG. 4 is a diagram schematically illustrating a power supply apparatus according to an embodiment of the invention.
Figure 5:
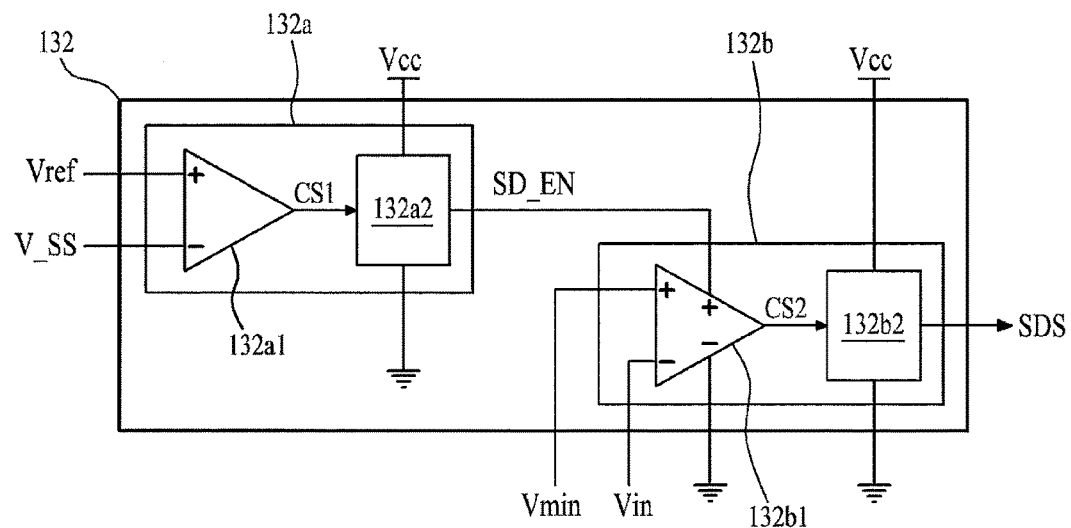
FIG. 5 is a diagram for describing a shutdown controller of FIG. 4.

FIG. 4 is a diagram schematically illustrating a power supply apparatus 100 according to an embodiment of the invention, and FIG. 5 is a diagram for describing a shutdown controller of FIG. 4.

Referring to FIGS. 4 and 5, the power supply apparatus 100 according to an embodiment of the invention includes one or more of a voltage converter 110, a voltage stabilizer 120, an overcurrent cutoff unit 130, and reference voltage supply unit 140.

The voltage converter 110, the voltage stabilizer 120, the overcurrent cutoff unit 130, and the reference voltage supply unit 140 may be integrated into one IC, and mounted on a printed circuit board (PCB). The PCB includes an input terminal Pin to which an input power Vin is applied, an intermediate terminal (or an intermediate node) Pmin which is supplied with a DC voltage from the voltage converter 110, and an output terminal Pout. Here, each of capacitors C for removing ripple and/or noise is connected between the input terminal Pin, the intermediate terminal Pmin, the output terminal Pout and respective grounds.

The voltage converter 110 converts the input power Vin into a DC voltage having a higher voltage level than that of the input power Vin by using the inductor L. To this end, the voltage converter 110 according to an embodiment includes a first switching element SW1 that is connected between the inductor L and the voltage stabilizer 120, a second switching element SW2 that is connected between a ground and a node which is disposed between the inductor L1 and the first switching element SW1, and a PWM controller 112 that generates first and second PWM signals S1 and S2 with a feedback output voltage to control a switching operation of each of the first and second switching elements SW1 and SW2.

The first switching element SW1 may include a gate terminal which is supplied with the first PWM signal S1 from the PWM controller 112, a first terminal that is connected to the inductor L, a second terminal that is connected to the overcurrent cutoff unit 130, and an internal diode which is formed between the first and second terminals. Here, the internal diode of the first switching element SW1 is formed in a forward direction with respect to a path of a current which flows from an input terminal Pin, supplied with the input power Vin, to the output terminal Pout, and cuts off a reverse current when the first switching element SW1 is turned off. The first switching element SW1 may be configured with an NMOS transistor.

The second switching element SW2 may include a gate terminal which is supplied with the second PWM signal S2 from the PWM controller 112, a first terminal that is connected between the inductor L and the first terminal of the first switching element SW1, and a second terminal that is connected to a ground power terminal. The second switching element SW2 may be configured with an NMOS transistor or an N-type field effect transistor (FET).

The PWM controller 112 receives a feedback voltage Vout of the output terminal Pout to generate a feedback output voltage, and generates the first and second PWM signals S1 and S2, which are used to convert the input power Vin into a DC voltage, to control a switching operation of each of the first and second switching elements SW1 and SW2, based on the generated feedback output voltage. At this time, the PWM controller 112 generates a soft start voltage V_SS which increases linearly with the input power Vin, and is configured to include a soft start circuit to switch the first and second switching element SW1 and SW2 to a soft start mode according to the generated soft start voltage V_SS.

The voltage converter 110 alternately turns on the first and second switching elements SW1 and SW2 according to a switching control of the PWM controller 112 to store a current based on the input power Vin in the inductor L, and adds the current, stored in the inductor L, to the input power Vin to output a DC voltage having a higher voltage level than the input power Vin.

The voltage stabilizer 120 stabilizes the DC voltage which is supplied from the voltage converter 110 through the intermediate node Pmin, and outputs the stabilized DC voltage to the output terminal Pout. To this end, the voltage stabilizer 120 according to an embodiment includes a third switching element SW3, which is connected between the output terminal Pout and the intermediate node Pmin, and an LDO (Low Drop Out) controller 122 that generates a third PWM signal S3 with the voltage Vout of the output terminal Pout to control a switching operation of the third switching element SW3.

The third switching element SW3 may include a gate terminal which is supplied with the third PWM signal S3 from the LDO controller 122, a first terminal which is connected to the intermediate node Pmin, a second terminal which is connected to the output terminal Pout, and an internal diode which is formed between the first and second terminals. Here, the internal diode of the third switching element SW3 is formed in a reverse direction with respect to a path of a current which flows from the intermediate node Pmin to the output terminal Pout, and cuts off a forward current when the third switching element SW3 is turned off. The third switching element SW3 may be configured with an NMOS transistor.

The LDO controller 122 receives the feedback voltage Vout of the output terminal Pout to generate the feedback output voltage, and generates the third PWM signal S3, which is used to stabilize a DC voltage output to the output terminal Pout, to control a switching operation of the third switching element SW3, based on the generated feedback output voltage.

The voltage stabilizer 120 turns on the third switching element SW3 according to a switching control of the LDO controller 12, and allows the DC voltage, which is output to the output terminal Pout, to have a constant DC level.

The overcurrent cutoff unit 130 is connected between the voltage converter 110 and the intermediate node Pmin, and cuts off an overcurrent which flows from the voltage converter 110 to the intermediate node Pmin, based on a voltage of the intermediate node Pmin. To this end, the overcurrent cutoff unit 130 according to an embodiment includes a switching transistor Tsw, which is connected between the voltage converter 110 and the intermediate node Pmin, and a shutdown controller 132 which generates a shutdown signal SDS on the basis of a voltage of the intermediate node Pmin to control a switching operation of the switching transistor Tsw.

The switching transistor Tsw may include a gate terminal which is supplied with the shutdown signal SDS from the shutdown controller 132, a first terminal that is connected to the second terminal of the first switching element SW1 through an output node 100o of the voltage converter 110, a second terminal that is connected to the intermediate node Pmin, and an internal diode which is formed between the first and second terminals. Here, the internal diode of the switching transistor Tsw is formed in a reverse direction with respect to a path of a current which flows from the voltage converter 110 to the intermediate node Pmin, and cuts off a forward current when the switching transistor Tsw is turned off. The switching transistor Tsw may be configured with an NMOS transistor. When a normal current flows from the voltage converter 110 to the intermediate node Pmin, the switching transistor Tsw maintains a turn-on state. Under a condition in which the intermediate node Pmin is short-circuited with the ground power terminal, the switching transistor Tsw is turned off. Therefore, due to the short circuit, the switching transistor Tsw cuts off an overcurrent which flows to the intermediate node Pmin.

The shutdown controller 132 generates the shutdown signal SDS, based on a feedback intermediate node voltage which is fed back from the intermediate node Pmin, to control a switching operation of the switching transistor Tsw. That is, the shutdown controller 132 monitors the input power Vin and a voltage of the intermediate node Pmin to turn on the switching transistor Tsw, thereby cutting off an overcurrent which flows to the intermediate node Pmin. Therefore, when a normal current flows from the voltage converter 110 to the intermediate node Pmin, the switching transistor Tsw maintains a turn-on state, and when the voltage of the intermediate node Pmin is lower than the voltage of input power Vin due to a condition such as the intermediate node Pmin being short-circuited with the ground power terminal, the switching transistor Tsw is turned off.

The shutdown controller 132 includes a shutdown operation delayer 132a and a shutdown signal generator 132b.

The shutdown operation delayer 132a generates a shutdown enable signal SD_EN, based on a soft start voltage V_SS and a reference voltage Vref which are input thereto. Here, the shutdown operation delayer 132a delays a shutdown operation of the overcurrent cutoff unit 130 so that the switching transistor Tsw is not turned off in a soft start section which is performed when the voltage converter 110 is initially driven. To this end, the shutdown operation delayer 132a includes a first comparison unit 132a1, which compares the soft start voltage V_SS and the reference voltage Vref to generate a first comparison signal CS1, and a shutdown enable signal output unit 132a2 that outputs the shutdown enable signal SD_EN according to the first comparison signal CS1 supplied from the first comparison unit 132a1.

Figure 6:
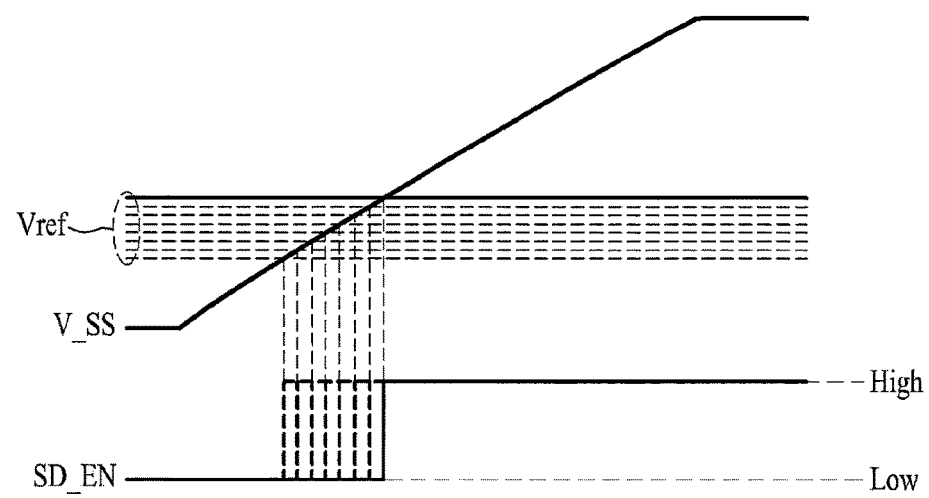
FIG. 6 is a waveform diagram for describing an operation of a shutdown operation delayer of FIG. 5.

The first comparison unit 132a1 compares the reference voltage Vref with the soft start voltage V_SS, which is supplied from the PWM controller 112 of the voltage converter 110, to generate the first comparison signal CS1. The first comparison unit 132a1 according to an embodiment may be configured with an operational amplifier that includes a non-inverting terminal (+) which is supplied with the reference voltage Vref, an inverting terminal (−) which is supplied with the soft start voltage V_SS, and an output terminal that is connected to the shutdown enable signal output unit 132a2. Here, as shown in FIG. 6, the soft start voltage V_SS linearly increases due to a soft start operation of the voltage converter 110. Therefore, when the soft start voltage V_SS is lower than the reference voltage Vref, the first comparison unit 132a1 generates the first comparison signal CS1 having a low level, and when the soft start voltage V_SS is higher than the reference voltage Vref, the first comparison unit 132a1 generates the first comparison signal CS1 having a high level. That is, when the soft start voltage V_SS is higher than the reference voltage Vref, the first comparison unit 132a1 outputs the first comparison signal CS1 having a high level, and otherwise, the first comparison unit 132a1 outputs the first comparison signal CS1 having a low level.

The shutdown enable signal output unit 132a2 outputs the shutdown enable signal SD_EN having a high level or a low level according to the first comparison signal CS1 supplied from the first comparison unit 132a1. That is, the shutdown enable signal output unit 132a2 outputs the shutdown enable signal SD_EN having a low level corresponding to a voltage level of a ground power according to the first comparison signal CS1 having a low level which is supplied from the first comparison unit 132a1. Also, the shutdown enable signal output unit 132a2 outputs the shutdown enable signal SD_EN having a high level corresponding to a voltage level of a logic power Vcc according to the first comparison signal CS1 having a high level which is supplied from the first comparison unit 132a1. The shutdown enable signal output unit 132a2 may be configured with a multiplexer or a switching circuit, which outputs the shutdown enable signal SD_EN having a high level or a low level according to the first comparison signal CS1.

The first comparison signal CS1 that is an output signal of the first comparison unit 132a1 is supplied as a driving start signal of the below-described shutdown signal generator 132b. However, when the first comparison signal CS1 has a voltage level which is sufficient to drive the shutdown enable signal generator 132b, the shutdown enable signal output unit 132a2 may be omitted.

In addition, as shown in FIG. 6, the shutdown enable signal SD_EN is shifted to a high level when the soft start voltage V_SS is higher than the reference voltage Vref after a certain delay time elapses from a driving start time of the voltage converter 110. In this instance, the delay time may vary according to the varying of the reference voltage Vref or/and a slope of the soft start voltage V_SS.

In order to vary the delay time by varying the reference voltage Vref, as illustrated in FIG. 4, the power supply apparatus 100 may further include a reference voltage supply unit 140.

The reference voltage supply unit 140 includes a reference voltage generator 142, which generates a plurality of reference voltages Vref1 to Vref8 by using the input power Vin, and a voltage selector 144 that selects one reference voltage from among the plurality of reference voltages Vref1 to Vref8 according to a voltage selection signal SEL supplied from the outside.

The reference voltage generator 142 may include a plurality of resistors which are serially connected between an input power Vin terminal and the ground power terminal. The reference voltage generator 142 generates the plurality of reference voltages Vref1 to Vref8 through a plurality of voltage division nodes respectively formed between the plurality of resistors by using a voltage dividing method based on resistance values of the resistors.

The voltage selector 144 is configured with a multiplexer. The voltage selector 144 selects one of the plurality of reference voltages Vref1 to Vref8 as the reference voltage Vref according to the voltage selection signal SEL, and supplies the selected reference voltage Vref to the first comparison unit 132a1.

In varying the delay time by varying the slope of the soft start voltage V_SS, according to an embodiment of the invention, the slope of the soft start voltage V_SS varies by varying a resistance value or capacitance value of a soft start circuit included in the PWM controller 112 of the voltage converter 110.

Referring again to FIGS. 4 and 5, the shutdown signal generator 132b starts to drive (or starts working) according to the shutdown enable signal SD_EN supplied from the shutdown operation delayer 132a, and generates the shutdown signal SDS with the input power Vin and the feedback intermediate node voltage Vmin to control a switching operation of the switching transistor Tsw. To this end, the shutdown signal generator 132b according to an embodiment includes a second comparison unit 132b1, which starts to drive (or starts working) according to the shutdown enable signal SD_EN and compares the input power Vin and the feedback intermediate node voltage Vmin to generate a second comparison signal CS2, and a shutdown signal output unit 132b2 that outputs the shutdown signal SDS for controlling the switching operation of the switching transistor Tsw according to the second comparison signal CS2 supplied from the second comparison unit 132b1.

The second comparison unit 132b1 starts to drive (or starts working) according to the shutdown enable signal SD_EN, and compares the input power Vin and the feedback intermediate node voltage Vmin to generate the second comparison signal CS2. The second comparison unit 132b1 according to an embodiment may be configured with an operational amplifier that includes a non-inverting terminal (+) which is supplied with the input power Vin, an inverting terminal (−) which is supplied with the feedback intermediate node voltage Vmin, a positive (+) power terminal which is supplied with the shutdown enable signal SD_EN, and a negative (−) power terminal which is connected to the ground power terminal. Here, under a normal condition in which the intermediate node Pmin is not short-circuited with the ground power terminal in a state where the voltage converter 110 outputs a DC voltage having a higher voltage level than that of the input power Vin, the input power Vin always is lower than the feedback intermediate node voltage Vmin. However, when the intermediate node Pmin is short-circuited with the ground power terminal, the intermediate node Pmin is 0 V, and thus, the input power Vin is higher than the feedback intermediate node voltage Vmin. Therefore, when the input power Vin is lower than the feedback intermediate node voltage Vmin, the second comparison unit 132b1 generates the second comparison signal CS2 having a low level, and when the input power Vin is higher than the feedback intermediate node voltage Vmin, the second comparison unit 132b1 generates the second comparison signal CS2 having a high level. That is, when the input power Vin is higher than the feedback intermediate node voltage Vmin, the second comparison unit 132b1 outputs the second comparison signal CS2 having a high level, and otherwise, the second comparison unit 132b1 outputs the second comparison signal CS2 having a low level.

A shutdown signal output unit 134b2 outputs the shutdown signal SDS having a high level or a low level according to the second comparison signal CS2 supplied from the second comparison unit 132b1. That is, the shutdown signal output unit 134b2 outputs the shutdown signal SDS of a gate-on voltage or a gate-off voltage according to the second comparison signal CS2 supplied from the second comparison unit 132b1. That is, the shutdown signal output unit 134b2 outputs the shutdown signal SDS of the gate-on voltage having a voltage level of the logic power Vcc according to the second comparison signal CS2 having a low level which is supplied from the second comparison unit 132b1. Furthermore, the shutdown signal output unit 134b2 outputs the shutdown signal SDS of the gate-off voltage having a voltage level of the ground power according to the second comparison signal CS2 having a high level which is supplied from the second comparison unit 132b1. The shutdown signal output unit 134b2 may be configured with a multiplexer or a switching circuit, which outputs the shutdown signal SDS of the gate-on voltage or the gate-off voltage according to the second comparison signal CS2.

When the second comparison signal CS2 that is an output signal of the second comparison unit 132b1 has a voltage level which is sufficient to turn on/off the switching transistor Tsw, the shutdown signal output unit 132b2 may be omitted. In this instance, the second comparison unit 132b1 according to another embodiment may be configured with an operational amplifier that includes a non-inverting terminal (+) which is supplied with the feedback intermediate node voltage Vmin, an inverting terminal (−) which is supplied with the input power Vin, a positive (+) power terminal which is supplied with the shutdown enable signal SD_EN, and a negative (−) power terminal which is connected to the ground power terminal. When the input power Vin is lower than the feedback intermediate node voltage Vmin, the second comparison unit 132b1 according to another embodiment generates the second comparison signal CS2 having a high level, and when the input power Vin is higher than the feedback intermediate node voltage Vmin, the second comparison unit 132b1 generates the second comparison signal CS2 having a low level. That is, when the input power Vin is higher than the feedback intermediate node voltage Vmin, the second comparison unit 132b1 according to another embodiment outputs the second comparison signal CS2 having a low level for turning off the switching transistor Tsw, and otherwise, the second comparison unit 132b1 outputs the second comparison signal CS2 having a high level.

Figure 7:
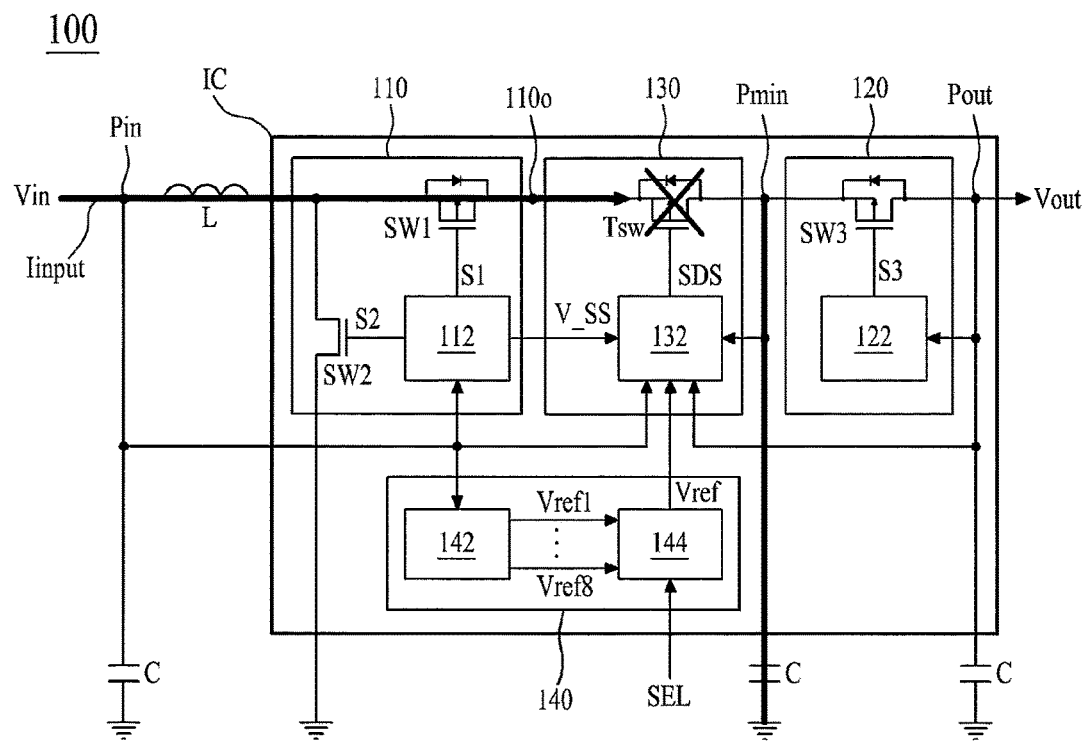
FIG. 7 is a diagram for describing a shutdown operation when an intermediate node is short-circuited with a ground power terminal, in the power supply apparatus according to an embodiment of the invention.
Figure 8:
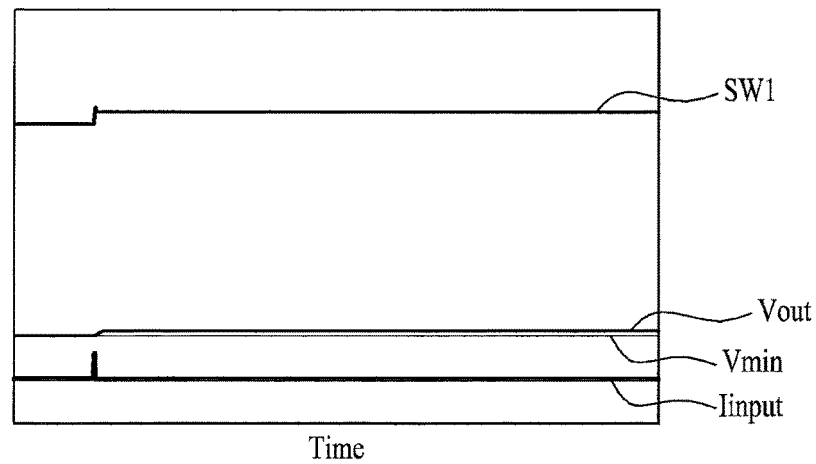
FIG. 8 is a simulation waveform diagram of the power supply apparatus according to an embodiment of the invention in which the intermediate node of FIG. 7 is short-circuited with the ground power terminal.

FIG. 7 is a diagram for describing a shutdown operation when an intermediate node is short-circuited with a ground power terminal, in the power supply apparatus according to an embodiment of the invention, and FIG. 8 is a simulation waveform diagram of the power supply apparatus according to an embodiment of the invention in which the intermediate node of FIG. 7 is short-circuited with the ground power terminal.

As seen in FIGS. 7 and 8, when the intermediate node Pmin is short-circuited with the ground power terminal, the voltage Vmin of the intermediate node Pmin becomes 0 V and is lower than the input power Vin, and thus, the shutdown signal output unit 134b2 outputs the shutdown signal SDS of the gate-off voltage, whereby the switching transistor Tsw is turned off and shut down. Therefore, a path of a current which flows from the input power Vin to the intermediate node Pmin is blocked.

Figure 1:
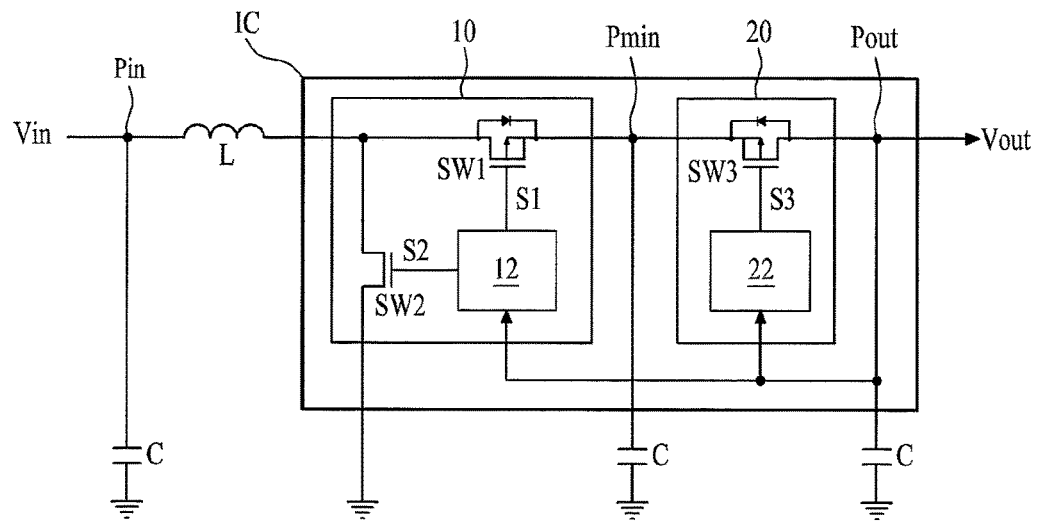
FIG. 1 is a diagram for describing a related art power supply apparatus.
Figure 2:
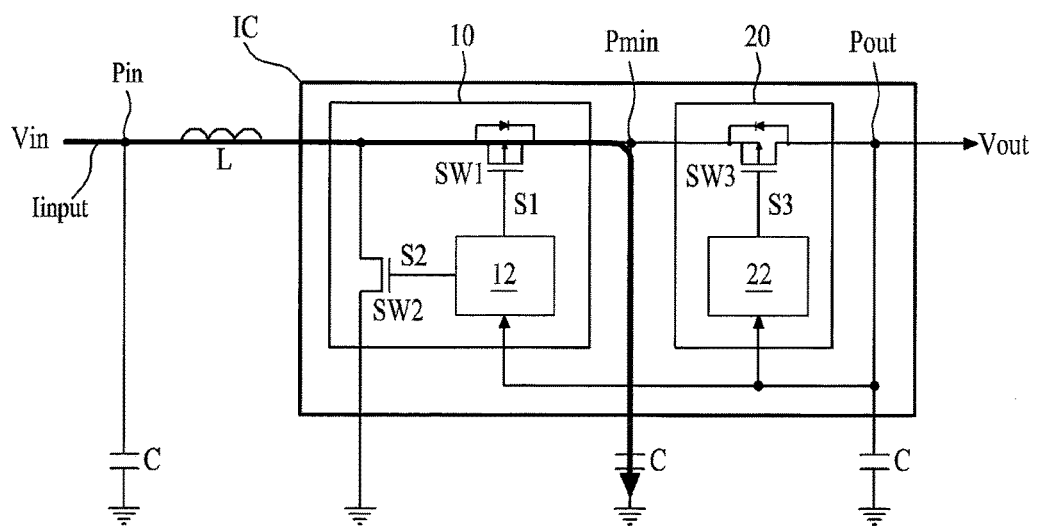
FIG. 2 is a diagram illustrating a current path when an intermediate node of FIG. 1 is short-circuited with a ground power terminal.
Figure 3:
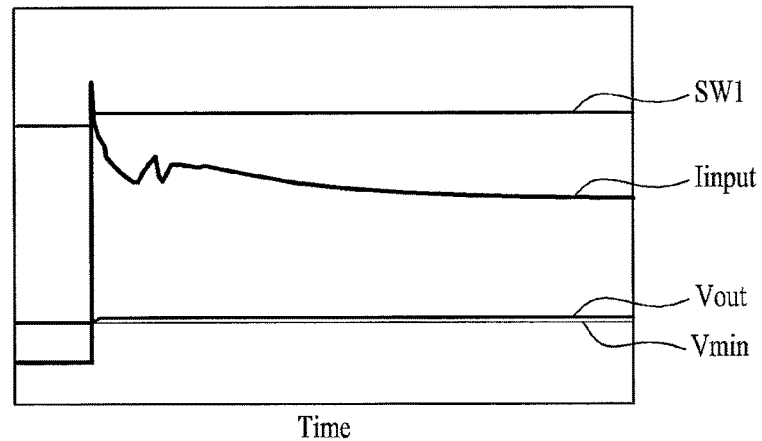
FIG. 3 is a simulation waveform diagram of the related art power supply apparatus in which the intermediate node of FIG. 1 is short-circuited with the ground power terminal.

Therefore, in the related art, when the intermediate node is short-circuited with the ground power terminal, as shown in FIG. 3, a path of a current which flows from the input power Vin to the intermediate node Pmin is formed, and a high current instantaneously flows in the intermediate node.

However, according to embodiments of the invention, as shown in FIG. 8, it can be seen that an input current Iinput flowing in the intermediate node is minimized despite the intermediate node being short-circuited with the ground power terminal.

As a result, according to embodiments of the invention, the inductor L and the first switching element SW1 of the voltage converter 110 can be prevented from being damaged (or broken down) due to a momentary overcurrent which occurs when the intermediate node is short-circuited with the ground power terminal, and moreover, the IC and the PCB can be prevented from being heated due to the momentary overcurrent, thereby preventing fire.

The power supply apparatus 100 according to an embodiment of the invention may be used as a power supply apparatus for flat panel display devices which include liquid crystal display (LCD) devices, organic light emitting display devices, and plasma display devices, and may be applied to power supply apparatuses for various information devices or any device requiring a DC voltage.

Figure 9:
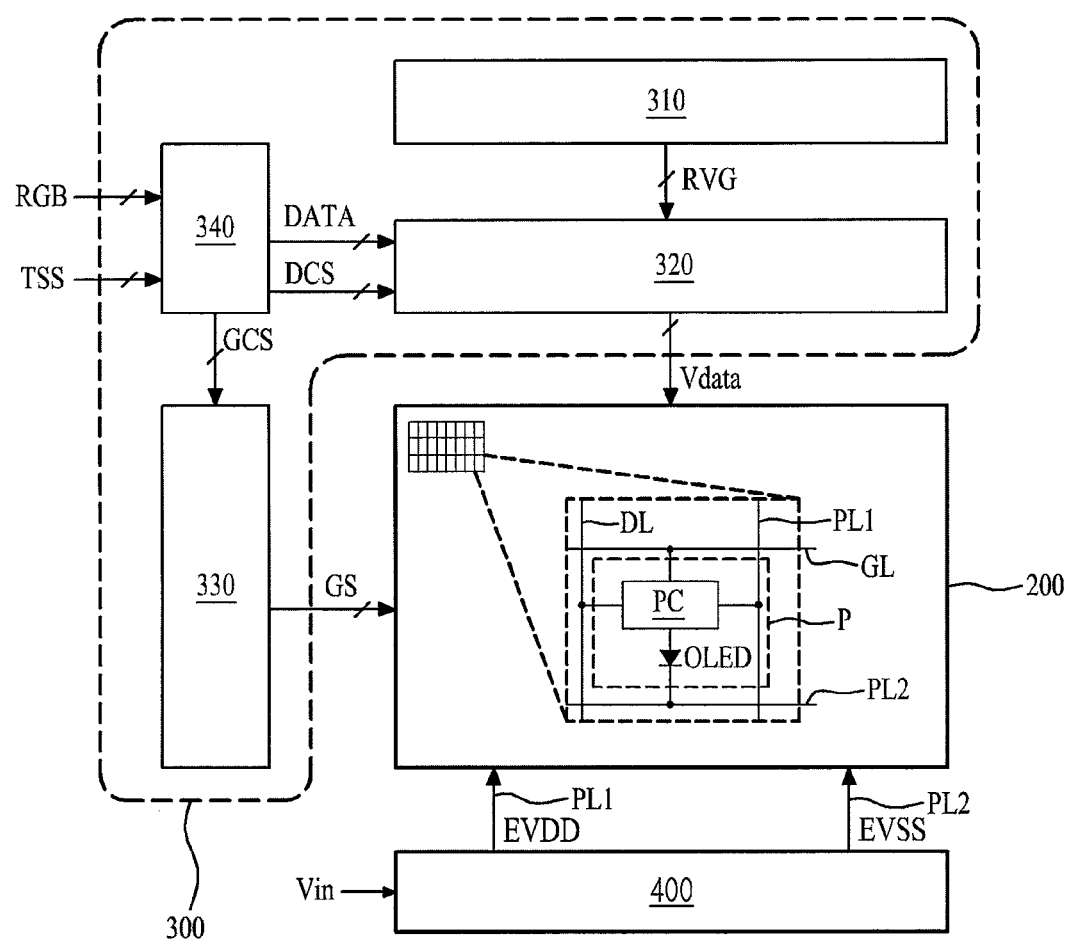
FIG. 9 is a diagram for describing a display device according to an embodiment of the invention.

FIG. 9 is a diagram for describing a display device according to an embodiment of the invention.

Referring to FIG. 9, the display device according to an embodiment of the invention includes a display panel 200, a panel driver 300, and a power supply unit 400.

The display panel 200 includes a plurality of pixels P that are respectively formed in a plurality of pixel areas defined by intersections between a plurality of gate lines GL and a plurality of data lines DL.

Each of the plurality of pixels P includes a pixel circuit PC and an organic light emitting diode OLED.

The pixel circuit PC controls a current flowing from a first driving power line PL1 (through which a high-level voltage EVDD is supplied) to the organic light emitting diode OLED, based on a data voltage Vdata which is supplied to a data line DL according to a gate signal GS supplied from the panel driver 300 to a gate line GL. For example, the pixel circuit PC may include a driving transistor, which controls a current flowing in the organic light emitting diode OLED, and a capacitor which is connected between a source electrode and a gate electrode of the driving transistor. Here, each of a plurality of transistors Tsw1, Tsw2 and Tdr is a thin film transistor (TFT), and may be an a-Si TFT, a poly-Si TFT, an oxide TFT, or an organic TFT.

The organic light emitting element OLED is connected between the pixel circuit PC and a cathode voltage VSS line, and emits light in proportion to a data current supplied from the pixel circuit PC to emit certain color light. To this end, the organic light emitting element OLED includes an anode electrode (a pixel electrode) connected to a source electrode included in the driving transistor of the pixel circuit, a cathode electrode (a reflective electrode) connected to a second power line PL2 through which a low-level voltage EVSS is supplied, and an emission cell that is formed between the anode electrode and the cathode electrode to emit light of one of red, green, blue, and white. Here, the emission cell may be formed to have a structure of a hole transport layer/organic emission layer/electron transport layer or a structure of a hole injection layer/hole transport layer/organic emission layer/electron transport layer/electron injection layer. Further, the emission cell may further include a function layer for enhancing the emission efficiency and/or service life of the organic emission layer.

The panel driver 300 includes a reference gamma voltage supply unit 310, a data driving circuit unit 320, a gate driving circuit unit 330, and a timing controller 340.

The reference gamma voltage supply unit 310 may be implemented as a programmable gamma integrated circuit (IC) that generates a plurality of different reference gamma voltages RGV. The reference gamma voltage supply unit 310 generates the plurality of reference gamma voltages RGV having different voltage levels through a voltage distribution between a low-level voltage and a high-level voltage Vdd for generating the reference gamma voltage input, and supplies the plurality of reference gamma voltages RGV to the data driving circuit unit 320. At this time, the reference gamma voltage supply unit 310 may generate the plurality of reference gamma voltages RGV that are used in each pixel of a unit pixel in common, or generate the plurality of reference gamma voltages RGV by color separately (or independently) used in each pixel P of the unit pixel.

The data driving circuit unit 320 subdivides the plurality of reference gamma voltages RGV supplied from the reference gamma voltage supply unit 310 to generate a plurality of grayscale voltages, latches pixel data (R, G, B) input from the timing controller 340 according to a data control signal DCS supplied from the timing controller 340, and converts the latched pixel data into a plurality of data voltages Vdata by using the plurality of grayscale voltages to respectively supply the data voltages to the plurality of data lines DL.

The gate driving circuit unit 330 generates a gate signal according to a gate control signal GCS supplied from the timing controller 340, and sequentially supplies the gate signal to a plurality of gate lines GL. Here, the gate driving circuit unit 330 may be formed on a substrate simultaneously with a process of forming a TFT.

The timing controller 340 aligns input data RGB, received from the outside, into pixel data (R, G, B) so as to match a pixel arrangement structure of the display panel 200, and supplies the pixel data (R, G, B) to the data driving circuit unit 320. Also, the timing controller 340 generates the data control signal DCS for controlling an operation timing of the data driving circuit unit 320 and the gate control signal GCS for controlling an operation timing of the gate driving circuit unit 330 by using a timing sync signal TSS which is input thereto.

The power supply unit 400 generates and outputs a voltage for driving of the display device. In detail, the power supply unit 400 generates at least one of the high-level voltage EVDD and the low-level voltage EVSS which are supplied to each pixel P, and supplies the generated voltage to the corresponding driving power lines PL1 and PL2. In addition, the power supply unit 400 may generate and supply a driving voltage for driving of each of the reference gamma voltage supply unit 310, the data driving circuit unit 320, the gate driving circuit unit 330, and the timing controller 340. The power supply unit 400 includes at least one voltage generator. The at least one voltage generator includes at least one the power supply apparatus 100 described above with reference to FIGS. 4 and 5, and thus, its detailed description is not provided.

Figure 10:
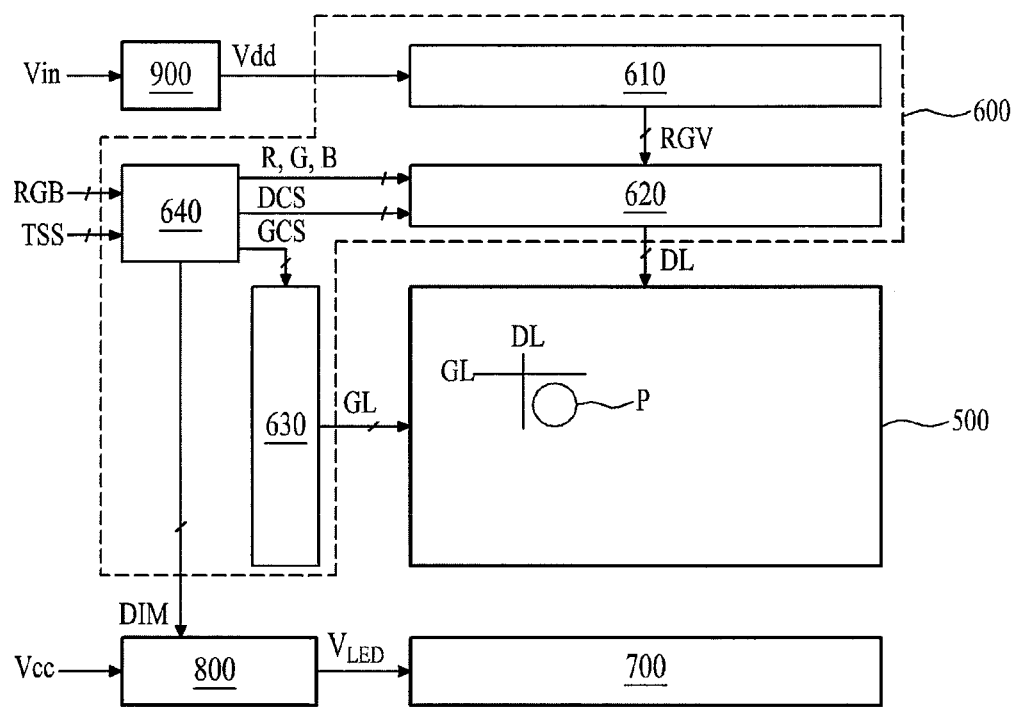
FIG. 10 is a diagram for describing a display device according to another embodiment of the invention.

FIG. 10 is a diagram for describing a display device according to another embodiment of the invention.

Referring to FIG. 10, the display device according to another embodiment of the invention includes a display panel 500, a panel driver 600, a backlight unit 700, a backlight driver 800, and a power supply unit 900.

The display panel 500 includes a plurality of pixels P that are respectively formed in a plurality of pixel areas defined by intersections between a plurality of gate lines GL and a plurality of data lines DL. Each of the plurality of pixels P includes a TFT, which is connected to a corresponding gate line GL and data line DL, and a liquid crystal cell connected to the TFT. The display panel 500 generates an electric field in the liquid crystal cell according to a data voltage supplied to each pixel P to adjust a transmittance of light irradiated from the backlight unit 700, thereby displaying an image.

The panel driver 600 includes a reference gamma voltage supply unit 610, a data driving circuit unit 620, a gate driving circuit unit 630, and a timing controller 640.

The gamma reference voltage supply unit 610 may be implemented as a programmable gamma integrated circuit (IC) that generates a plurality of different reference gamma voltages RGV. The reference gamma voltage supply unit 610 generates the plurality of reference gamma voltages RGV having different voltage levels through a voltage distribution between a low-level voltage and a high-level voltage Vdd supplied from the power supply unit 900 for generating the reference gamma voltage, and supplies the plurality of reference gamma voltages RGV to the data driving circuit unit 620. At this time, the reference gamma voltage supply unit 610 may generate the plurality of reference gamma voltages RGV that are used in each pixel of a unit pixel in common, or generate the plurality of reference gamma voltages RGV by color separately (or independently) used in each pixel P of the unit pixel.

The data driving circuit unit 620 subdivides the plurality of reference gamma voltages RGV supplied from the reference gamma voltage supply unit 610 to generate a plurality of positive/negative grayscale voltages, latches pixel data (R, G, B) input from the timing controller 640 according to a data control signal DCS supplied from the timing controller 640, converts the latched pixel data into a plurality of positive/negative data voltages Vdata by using the plurality of positive/negative grayscale voltages, and selects the positive/negative data voltages corresponding to a polarity control signal to respectively supply the selected data voltages to the plurality of data lines DL.

The gate driving circuit unit 630 generates a gate signal according to a gate control signal GCS supplied from the timing controller 640, and sequentially supplies the gate signal to a plurality of gate lines GL. Here, the gate driving circuit unit 630 may be formed on a substrate simultaneously with a process of forming a TFT.

The timing controller 640 aligns input data RGB, received from the outside, into pixel data (R, G, B) so as to match a pixel arrangement structure of the display panel 500, and supplies the pixel data (R, G, B) to the data driving circuit unit 620. Also, the timing controller 640 generates the data control signal DCS for controlling an operation timing of the data driving circuit unit 620 and the gate control signal GCS for controlling an operation timing of the gate driving circuit unit 630 by using a timing sync signal TSS which is input thereto.

The timing controller 640 generates a backlight dimming signal DIM for controlling a luminance of the backlight unit 700 according to a brightness of the image of one frame, and supplies the backlight dimming signal DIM to the backlight driver 800. Here, the timing controller 640 analyzes input data RGB of one frame to calculate an average image level, and generates the backlight dimming signal DIM based on the calculated average image level. For example, when an image of one frame is determined as a relatively bright image on the basis of an average image level, the timing controller 640 may generate the backlight dimming signal DIM for decreasing a luminance of the backlight unit 700, but when an image of one frame is determined as a relatively dark image on the basis of the average image level, the timing controller 640 may generate the backlight dimming signal DIM for increasing the luminance of the backlight unit 700.

The backlight unit 700 irradiates light onto the display panel 500 by using emission of light from a plurality of LEDs. The backlight unit 700 includes at least one LED array including a plurality of LEDs which are serially connected. Here, the backlight unit 700 may be an edge-type backlight unit or a direct-type backlight unit.

The backlight driver 800 modulates a pulse width and/or amplitude of a backlight driving voltage $V_{LED}$ according to the backlight dimming signal DIM, based on a constant voltage Vcc supplied from the power supply unit 900, to drive the backlight unit 700 (i.e., the LED array), thereby allowing light, having brightness corresponding to the backlight dimming signal DIM, to be irradiated onto the display panel 500.

The power supply unit 900 generates and outputs a voltage for driving of the display device. In detail, the power supply unit 900 may generate and supply a DC voltage for driving of at least one selected from the reference gamma voltage supply unit 610, the backlight unit 700, and the backlight driver 800 by using the input power Vin. In addition, the power supply unit 900 may generate and supply a driving voltage for driving of each of the data driving circuit unit 620, the gate driving circuit unit 630, and the timing controller 640. The power supply unit 900 includes at least one voltage generator. The at least one voltage generator includes at least one the power supply apparatus 100 described above with reference to FIGS. 4 and 5, and thus, its detailed description is not provided.

According to the embodiments of the invention, by blocking a path of a current which flows to an intermediate node according to a voltage of the intermediate node, and thus, an inductor and a switching element of a voltage converter can be prevented from being damaged (or broken down) due to a momentary overcurrent which is generated when the intermediate node is short-circuited with a ground power terminal, and moreover, the IC and the PCB can be prevented from being heated due to the momentary overcurrent, thereby preventing fire.

It will be apparent to those skilled in the art that various modifications and variations can be made in the embodiments of the invention without departing from the spirit or scope of the inventions. Thus, it is intended that the embodiments of the invention cover the modifications and variations of this invention provided they come within the scope of the appended claims and their equivalents.

What is claimed is:

1. A power supply apparatus comprising:
   a voltage converter configured to convert an input power into a DC voltage by using an inductor;
   a voltage stabilizer configured to stabilize the DC voltage which is supplied from the voltage converter through an intermediate node, and output the stabilized DC voltage to an output terminal; and
   an overcurrent cutoff unit connected between the voltage converter and the intermediate node, and configured to cut off an overcurrent which flows from the voltage converter to the intermediate node, based on a voltage of the intermediate node,
   wherein the voltage converter supplies a soft start voltage in which a voltage level of the DC voltage is linearly increased during initial driving, and
   wherein the overcurrent cutoff unit generates a shutdown enable signal while the soft start voltage is being supplied.

2. The power supply apparatus of claim 1, wherein the overcurrent cutoff unit comprises:
- a switching transistor connected between the voltage converter and the intermediate node; and
- a shutdown controller configured to generate a shutdown signal, based on the voltage of the intermediate node, to control a switching operation of the switching transistor.

3. The power supply apparatus of claim 2, wherein the switching transistor comprises an internal diode formed in a reverse direction with respect to a path of a current which flows from the voltage converter to the intermediate node.

4. The power supply apparatus of claim 2, wherein when the voltage of the intermediate node is lower than the input power, the shutdown controller generates a shutdown signal for turning off the switching transistor.

5. The power supply apparatus of claim 2, wherein,
- the voltage converter operates in a soft start mode based on the soft start voltage which linearly increases in initial driving, and
- the shutdown controller generates the shutdown enable signal according to a comparison result of a reference voltage and the soft start voltage, starts working according to the shutdown enable signal, and generates the shutdown signal according to a comparison result of the input power and the voltage of the intermediate node.

6. The power supply apparatus of claim 5, further comprising a reference voltage supply unit configured to generate a plurality of reference voltages having different voltage levels by using the input power, select one of the plurality of reference voltages according to a voltage selection signal, and supply the selected reference voltage to the shutdown controller.

7. A display device comprising:
- a display panel configured to include a pixel formed in a pixel area defined by an intersection of a gate line and a data line;
- a panel driver configured to supply a gate signal to the gate line, and supply a data voltage to the data line; and
- a power supply unit configured to convert an input power into a DC voltage, and supply the DC voltage to at least one selected from the display panel and the panel driver,
- wherein the power supply unit comprises:
- a voltage converter configured to convert an input power into the DC voltage by using an inductor;
- a voltage stabilizer configured to stabilize the DC voltage which is supplied from the voltage converter through an intermediate node, and output the stabilized DC voltage to an output terminal; and
- an overcurrent cutoff unit connected between the voltage converter and the intermediate node, and configured to cut off an overcurrent which flows from the voltage converter to the intermediate node, based on a voltage of the intermediate node,
- wherein the voltage converter supplies a soft start voltage in which a voltage level of the DC voltage is linearly increased during initial driving, and
- wherein the overcurrent cutoff unit generates a shutdown enable signal while the soft start voltage is being supplied.

8. The display device of claim 7, wherein,
the display panel further comprises a driving power line through which the DC voltage is supplied from the power supply unit to the pixel, and
the pixel comprises:
- an organic light emitting diode; and
- a pixel circuit configured to control a current which flows from the driving power line to the organic light emitting diode, based on the data voltage.

9. The display device of claim 7, further comprising:
- a backlight unit configured to irradiate light onto the display panel; and
- a backlight driver configured to drive the backlight unit,
- wherein the power supply unit generates the DC voltage for driving of at least one selected from the backlight unit and the backlight driver.

10. The display device of claim 7, wherein,
the panel driver comprises:
- a reference gamma voltage generator configured to generate a plurality of reference gamma voltages;
- a data driving circuit unit configured to convert input pixel data into the data voltage by using the plurality of reference gamma voltages to supply the data voltage to the data line;
- a gate driving circuit unit configured to supply the gate signal to the gate line; and
- a timing controller configured to control driving of the data driving circuit unit and the gate driving circuit unit, and supply the pixel data to the data driving circuit unit, and
the power supply unit generates the DC voltage for driving of at least one selected from the reference gamma voltage generator, the data driving circuit unit, the gate driving circuit unit, and the timing controller.

11. The display device of claim 7, wherein the overcurrent cutoff unit comprises:
- a switching transistor connected between the voltage converter and the intermediate node; and
- a shutdown controller configured to generate a shutdown signal, based on the voltage of the intermediate node, to control a switching operation of the switching transistor.

12. The display device of claim 11, wherein the switching transistor comprises an internal diode formed in a reverse direction with respect to a path of a current which flows from the voltage converter to the intermediate node.

13. The display device of claim 11, wherein when the voltage of the intermediate node is lower than the input power, the shutdown controller generates a shutdown signal for turning off the switching transistor.

14. The display device of claim 11, wherein,
- the voltage converter operates in a soft start mode based on the soft start voltage which linearly increases in initial driving, and
- the shutdown controller generates the shutdown enable signal according to a comparison result of a reference voltage and the soft start voltage, starts working according to the shutdown enable signal, and generates the shutdown signal according to a comparison result of the input power and the voltage of the intermediate node.

15. The display device of claim 14, further comprising a reference voltage supply unit configured to generate a plurality of reference voltages having different voltage levels by using the input power, select one of the plurality of reference voltages according to a voltage selection signal, and supply the selected reference voltage to the shutdown controller.

16. A power supply apparatus comprising:
- a voltage converter configured to convert an input power into a DC voltage by using an inductor;

a voltage stabilizer configured to stabilize the DC voltage which is supplied from the voltage converter through an intermediate node, and output the stabilized DC voltage to an output terminal; and an overcurrent cutoff unit connected between the voltage converter and the intermediate node, and including a switching transistor connected between the voltage converter and the intermediate node to cut off an overcurrent which flows from the voltage converter to the intermediate node when a voltage of the intermediate node is lower than the input power, wherein the voltage converter supplies a soft start voltage in which a voltage level of the DC voltage is linearly increased during initial driving, and wherein the overcurrent cutoff unit generates a shutdown enable signal while the soft start voltage is being supplied.

17. The power supply apparatus of claim 16, wherein the overcurrent cutoff unit further includes a shutdown controller configured to generate a shutdown signal, based on the voltage of the intermediate node, to control a switching operation of the switching transistor.

18. The power supply apparatus of claim 17, wherein the shutdown controller generates the shutdown signal for turning off the switching transistor when the voltage of the intermediate node is lower than the input power.

19. The power supply apparatus of claim 16, wherein the switching transistor comprises an internal diode formed in a reverse direction with respect to a path of a current which flows from the voltage converter to the intermediate node.

* * * * *